United States Patent [19]

Peterson et al.

[11] Patent Number: 4,834,189

[45] Date of Patent: May 30, 1989

[54] ROW CROP CULTIVATOR

[75] Inventors: Richard L. Peterson, LeSueur; James A. Johnson, Cologne; Vincent J. Tomlonovic, North Mankato, all of Minn.

[73] Assignee: Hiniker Company, Mankato, Minn.

[21] Appl. No.: 137,927

[22] Filed: Dec. 28, 1987

[51] Int. Cl.[4] .................. A01B 39/08; A01B 39/14
[52] U.S. Cl. ................................. 172/166; 172/310; 172/624.5; 172/722; 172/158; 172/510; 111/126
[58] Field of Search ............... 172/624.5, 509, 510, 172/722, 158, 166, 196, 310; 111/88, 87, 52, 7

[56] References Cited

U.S. PATENT DOCUMENTS

| | | | |
|---|---|---|---|
| 1,698,019 | 1/1929 | Howell | 172/166 X |
| 2,420,551 | 5/1947 | Morkoski | 111/87 |
| 2,440,174 | 4/1948 | Howard | 172/166 |
| 3,621,922 | 11/1971 | Hinken | 172/510 |
| 4,054,007 | 10/1977 | Moore | 172/624.5 |
| 4,461,355 | 7/1984 | Peterson | 172/624.5 |
| 4,538,532 | 9/1985 | Coker | 172/166 |
| 4,601,248 | 7/1986 | Beasley | 111/52 |

OTHER PUBLICATIONS

Hiniker Econ-o-Till Cultivator, Advertizing Brochure of Hiniker Co. Mankato MN 7/1981.

Primary Examiner—Richard J. Johnson
Attorney, Agent, or Firm—Orrin M. Haugen; Thomas J. Nikolai; Frederick W. Niebuhr

[57] ABSTRACT

An improved row crop cultivator for use in minimum tillage applications is described. A plurality of ganged cultivating units are mounted on a tool bar adapted to be towed behind a tractor vehicle. Each cultivating unit comprises a frame which is supported on a pair of spaced-apart gauge wheels. Also mounted on the frame for rotation within the gap between the gauge wheels is a disk-shaped coulter blade which is configured to cut through crop residue and weed debris as the material being cut is held against the ground surface by the gauge wheels. This arrangement tends to prevent improper cutting known as "hair-pinning". Trailing directly behind the coulter blade is a middleworker comprising a narrow width shank depending from the frame and having a weld point on its lower leading edge and wing-like share blades flaring rearwardly and outwardly at a predetermined angle from the lower end of the shank. The middleworker design reduces the tendency for slabs of earth to be thrown onto and thereby damaging growing row crops.

13 Claims, 2 Drawing Sheets

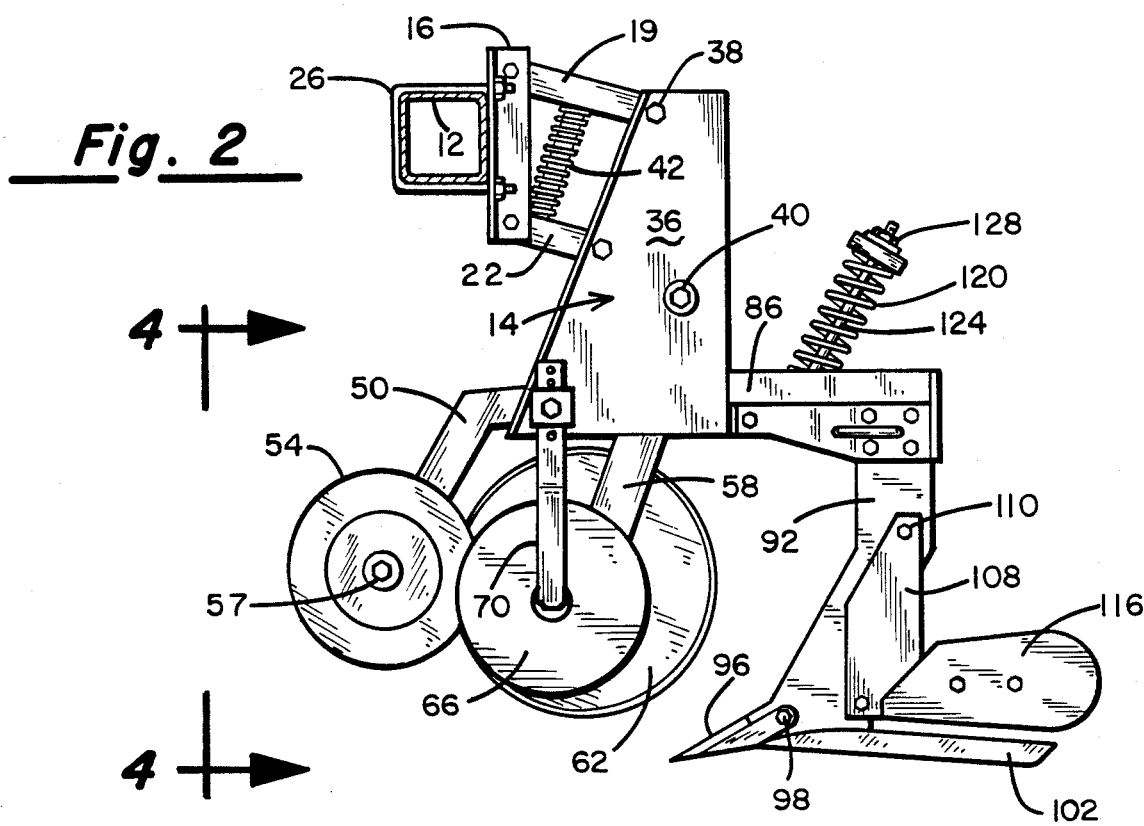
Fig. 2
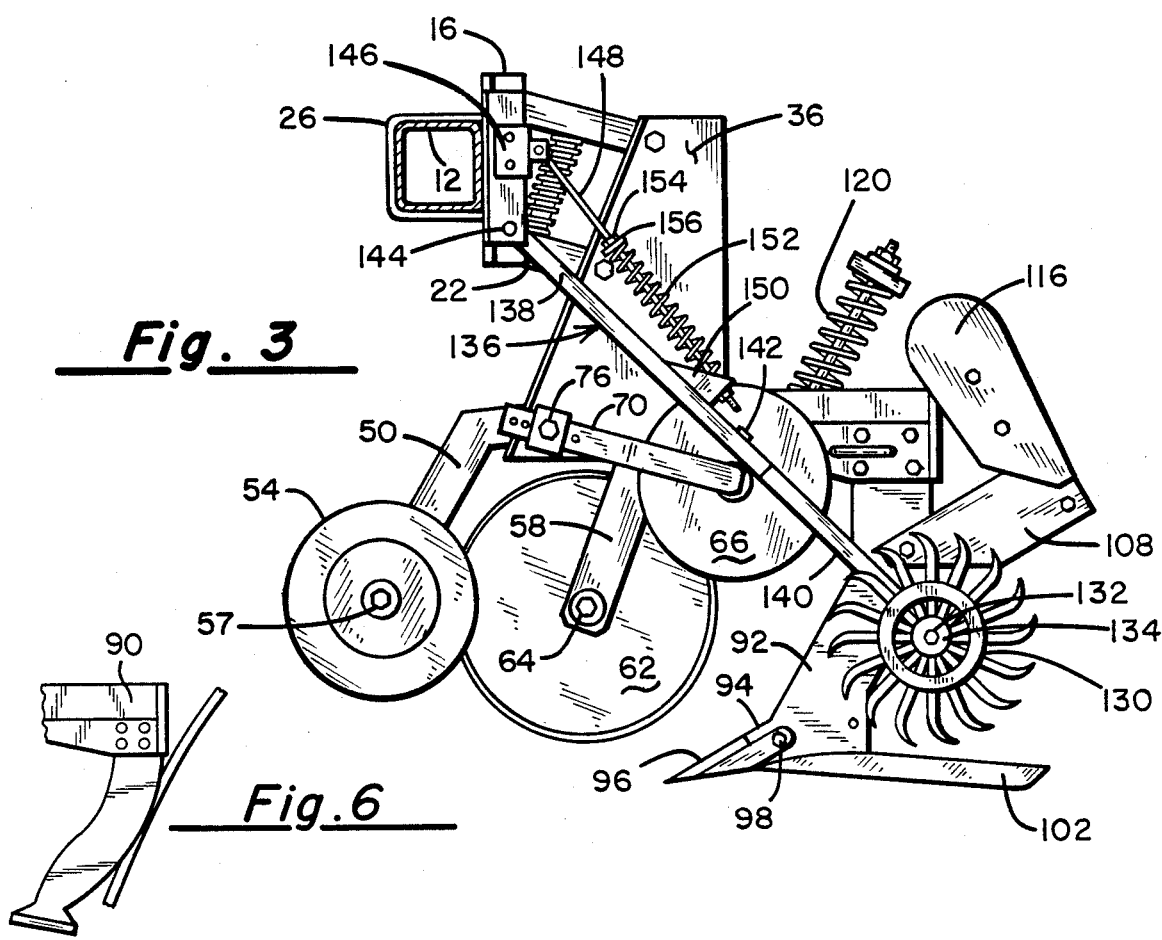
Fig. 3
Fig. 6

ROW CROP CULTIVATOR

BACKGROUND OF THE INVENTION

I. Field of the Invention

This invention relates generally to row crop cultivating equipment used in agriculture, and more specifically to a row crop cultivator which is more effective in its operation than known prior art apparatus intended for the same purpose.

II. Discussion of the Prior Art

The present invention is deemed to be an improvement over the inter-row crop cultivator described in U.S. Pat. No. 4,560,011 and 4,461,355, each of Which is assigned to the assignee of the present invention. In that prior art design, a plurality of ganged cultivator units are fixedly attached along the length of a tool bar which is arranged to be attached by a three-point hitch to a tractor-type vehicle, the tool bar extending transversely to the direction of travel of the tractor. Each of the ganged cultivating units includes a frame which is supported on a single gauge wheel which is vertically adjustable so as to effectively control depth at which other implements supported on the frame are made to penetrate the earth. These other implements typically include a coulter cutting wheel which is disposed directly behind the gauge wheel. It is intended to cut through weeds and other residue residing on the surface of the ground when minimum tillage agricultural practices are being employed. Another implement, the sweep, is disposed directly behind the coulter cutting wheel and is attached to the frame by a downwardly depending, relatively wide shank. The sweep loosens the soil and removes weeds from the row middle.

The frame of the earlier machine also supports additional implements, namely, a pair of cut-away disks which are spaced laterally outward from the gauge wheel and to either side of the path of travel of the coulter cutting wheel. The cut-away disks are designed to cut through the soil and residue at a location away from the crop row and till the area which is not affected by the sweep shares While the prior art row cultivator described in the afore referenced patents constitutes a marked improvement over the prior art existing at the time of its market introduction, further developments within the Hiniker Company (applicant's assignee) have resulted in significant improvements over the earlier design, which improvements result in superior performance. In the prior art design, where the stabilizing coulter cutting wheel is disposed in longitudinal alignment with the gauge wheel and is displaced a considerable distance behind it, there has been a tendency for the stabilizing coulter to merely push weeds, residue and debris into the soil rather than cutting through it. This is a condition referred to as "hair-pinning" because of the U-shape of the trash after it has been run over by the coulter. In that the residue is not properly cut, it tends to buildup around the sweep shank and plugs the underside of the cultivator. It is found that cut-away discs can compound this problem by diverting residue ahead of the stabilizing coulter.

In the earlier prior art design, the downwardly depending shank to which the sweep is secured is relatively thick and the angle of attack of the sweep is low, typically only about 20° to the horizontal. It has been found that as that row crop cultivator was pulled over the field, the sweeps would turn over the trash laden soil as slabs of earth, especially when working heavier and/or wetter soils. These slabs would then peel off the sweep and be displaced sufficiently to the side so that they would land on the crop row and crush or damage the young growing plants. While this problem could be obviated by operating the tractor at a reduced speed, the resulting waste of time, especially on larger farms, may well become excessive The addition of shields to cure the slabbing problem has proven only moderately successful because such shields tend to compound the plugging problem already mentioned.

Another drawback of the earlier prior art design reflected in the aforereferenced patents is related to the overall length of the cultivator unit, i.e., the distance that it projects rearward of the tool bar. This produces a torque on the tool bar which requires more powerful hydraulic components to lift the gang and reduces tractor handling dynamics.

OBJECTS

It is accordingly a principal object of the present invention to provide an improved row crop cultivator.

Another object of the invention is to provide a row crop cultivator which is more effective in operation than prior art systems for the same purpose.

Another object of the invention is to provide an improved row crop cultivator in which weeds, residue and other debris is more effectively cut prior to the turning of the soil and which can be operated at higher speeds and without serious plugging.

Yet another object of the invention is to provide an improved row crop cultivator reducing the tendency of earth slabs from damaging the row crops without resorting to the use of large, heavy, plug inducing shields as in most prior art row crop cultivators.

Yet still another object of the invention is to provide a row crop cultivator having an improved middleworker design for effectively increasing the downward force on the middleworker without increasing the amount of ballast employed to keep its shares embedded in the soil.

A still further object of the invention is to provide a row crop cultivator for use with ridge planted row crops for clearing weeds and residue from between the crop rows having a compact length dimension, thus placing the center of gravity of the cultivator modules closer to the tool bar whereby less force is required to lift the tool bar and its attached cultivator stages free of the ground when traveling to or from the field resulting in improved tractor handling stability.

SUMMARY OF THE INVENTION

These and other objects and advantages of the invention are realized by providing a plurality of row crop cultivator units which are mounted along the length of a tool bar and which are adapted to be pulled by a tractor vehicle. The cultivators are designed to work the soil between adjacent crop rows and, if desired, then deposit the worked soil so as to form ridges along the crop rows. Each of the plurality of cultivator units or gangs comprises a frame assembly fixedly attached to the tool bar. Secured to the frame and supporting it are a pair of gauge wheels which are mounted in parallel, spaced-apart relation on a common rotational axis.

First and second rotary hoe wheels or, as an alternative option, cut-away disks are rotatably suspended from the tool bar or the frame and are positioned on opposed sides and somewhat behind the pair of gauge wheels. In the case of the rotary hoe wheels, they comprise a circular hub having a plurality of radially extending curved spikes, the wheels being journaled for rotation in pairs at the lower end of an elongated arm whose other end is secured to the tool bar or other suitable location. The rotary hoe wheels are spaced apart to straddle the crow row. The rotary hoe wheels create a fault line alongside the crop ridges and do not tend to concentrate the residue between them a is usually the case with concave, inclined cut-away disks. Cutaway disks, on the other hand, have a concave working surface inclined and obliquely mounted relative to the direction of t ravel. These cut-away disks clear a strip of top soil and residue while mixing same between the disk blade pair.

Also suspended from the frame is a disk-shaped stabilizing coulter blade which is journaled to rotate with its leading edge surface positioned between and a predetermined distance forward of the trailing edge surfaces of the pair of gauge wheels. Because of the positioning of the stabilizing coulter blade relative to the gauge wheels, the gauge wheels tend to hold weeds, residue and other debris firmly against the ground surface as the coulter cutting blade severs this debris. Hairpinning, i.e., the forcing of the weeds into the ground beneath the coulter cutter, is greatly reduced. As such, the tendency of residue to pile up on the sweep shank a condition referred to as plugging, is obviated.

There is also suspended from the frame a so-called "middleworker" comprising a downwardly depending shank of a narrow width and having a forwardly and downwardly projecting nose or subsoiler point attached at the lower end thereof. This subsoiler point is somewhat wider than the thickness of the shank. Located a somewhat critical distance behind the point at the lower end of the shank are rearwardly and outwardly flared wing members. Attached to these wing members are a pair of replaceable lay shares which are at a predetermined, somewhat critical angle to the horizontal. As the sweep assembly is pulled behind the coulter, the subsoiler point digs into the ground creating a downward force to hold the tillage unit in the ground. This obviates the need for additional ballast carried by the tool bar for providing the necessary downward force on the lay shares.

The spacing between adjacent rotary hoe wheels is such that the middleworker will fit between them. When the rotary hoe wheels are so positioned, the middleworker churns the earth between the fault lines created by the rotary hoe wheels.

Selectively deployable ridger blades may also be joined to the shank to which the lay shares are affixed. The ridger blades can be positioned at an elevated disposition out of contact with the soil or a lowered disposition which is immediately above and generally vertically aligned with the lay share members. The ridger blades, when in their lowered disposition, tend to form the worked soil into parallel ridges on opposite sides of the shank and along adjacent crop rows. The width of the shank of the middleworker assembly and the increased angle of attack of the sweep shares (31 degrees vs. 20 degrees) is designed so that, at normal operating speeds, the earth and residue is more effectively pulverized and is not turned as a slab to fly onto the crop rows. Thus, damage to young plants is avoided. The height of the gauge wheels, the stabilizing coulter, the cut-away disks and the lay shares are each readily adjustable by the operator using a single wrench and from a location immediately behind the cultivator unit. The same holds true for the down pressure adjustment.

DESCRIPTION OF THE DRAWINGS

The foregoing advantages and features of the invention will become apparent to those skilled in the art from the following detailed description of a preferred embodiment, especially when taken in conjunction with the accompanying drawings wherein like numerals in the several views refer to corresponding parts.

FIG. 2 is a side elevation of one row crop cultivator unit showing the cut-away disks and ridger blades in their normal operating disposition;

FIG. 3 is a side elevation view of a cultivator stage illustrating the cut-away disks and ridger blades in their raised disposition and the rotary hoe wheels deployed;

FIG. 4 is a partial cross-sectional view taken along the lines 4—4 in FIG. 2;

FIG. 5 is a diagram showing the orientation of the rotary hoe wheels on adjacent row crop cultivator stages relative to the middleworker of one of the stages; and FIG. 6 depicts a fertilizer knife attachable to the cultivator frame.

DESCRIPTION OF THE PREFERRED EMBODIMENT

Figure 1:
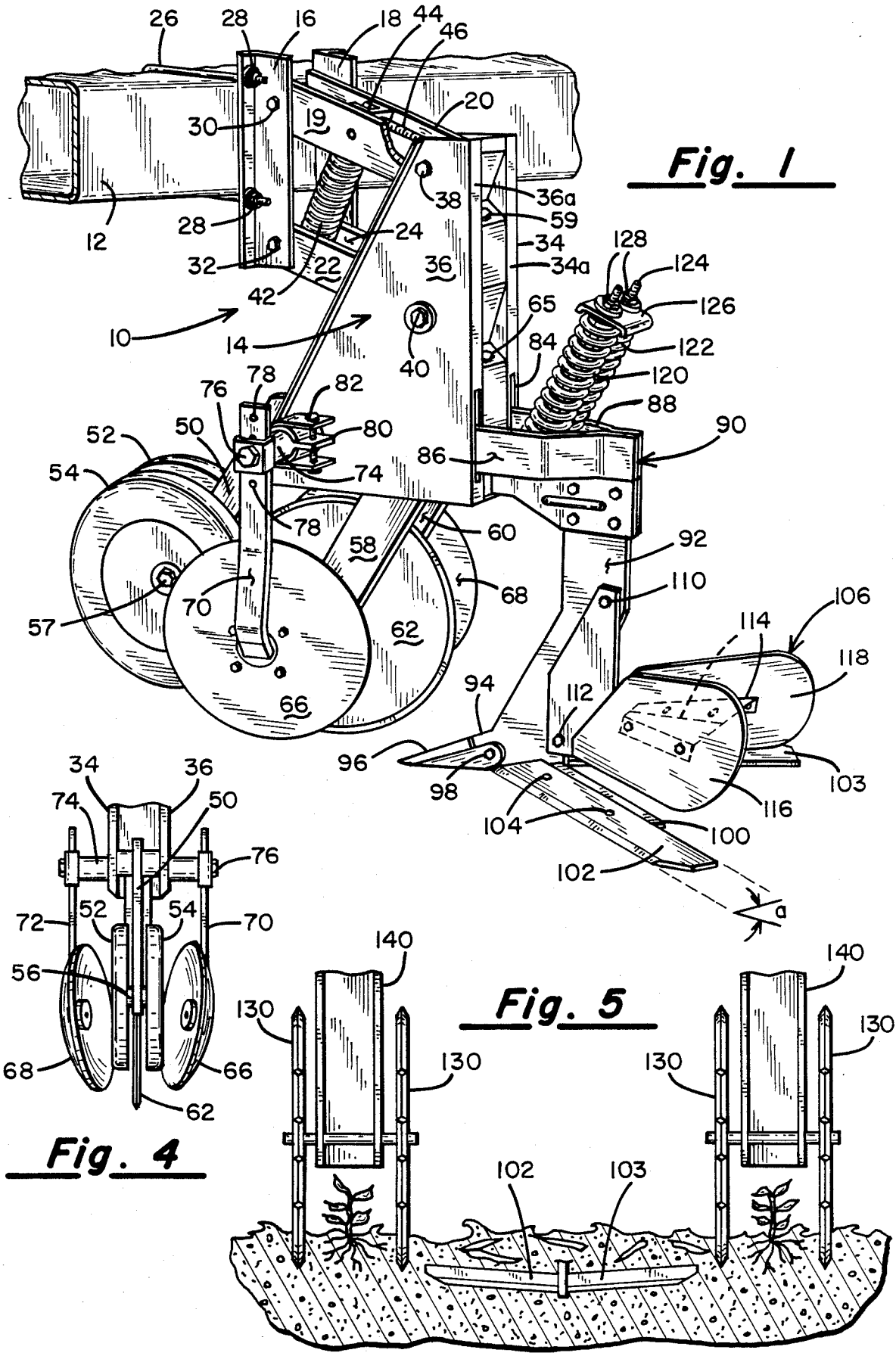
FIG. 1 is a partial perspective view of a cultivator assembly in accordance with the present invention.

Referring first to the perspective view of FIG. 1, there is identified by numeral 10 a single unit of a row crop cultivator in accordance with the present invention. It is to be understood that in most applications, a plurality of identical cultivator units tend to be secured to a tool bar at predetermined spacings relative to one another where the number of units ganged together is determined by the number of rows to be simultaneously cultivated. For example, typical configurations may include anywhere from five to seventeen, such assemblies fastened to the tool bar 12 when treating from four to twelve crop rows simultaneously.

Tool bar 12 is tubular and has a rectangular cross-section, typically 7 inches on a side. Contained in the hollow center of the tool bar 12 may be ballast in the form of removable concrete blocks which provide additional down-weight if required. The cultivator unit includes a frame, indicated generally by numeral 14, which includes first and second vertically oriented angle bars 16 and 18 to which are pivotally joined parallel linkage members 19–20 and 22–24. Disposed between the parallel linkage bars 19–20 is a first tubular spacer (not shown), and a bolt 30 passes through the angle bars 16 and 18 and through this spacer as a pivot connection. Similarly, a tubular spacer is disposed between the linkage bars 22–24, with bolt 32 passing through that spacer as well as through the support members 16 and 18 and the parallel linkage bars 22–24.

The frame 14 is also seen to include right and left mast plates 34 and 36, which are pivotally secured on opposed sides of the upper and lower parallel linkage pairs 19–20 and 22–24. More particularly, a first elongated bolt 38 is made to pass through the left mast plate 36, through the linkage bar 19, through a tubular spacer (not shown), through the linkage bar 20 and then through the righthand mast plate 34. A nut (not shown) threaded onto the bolt holds it in place. In a similar fashion, a bolt 40 passes through the mast plates 34 and 36 and through the lower parallel linkage bars 22–24 to complete the parallelogram arrangement.

A heavy tension spring is affixed at its lower end to the spacer (not shown) through which the bolt 32 passes. The upper end of the spring 42 is secured to a channel 44 slidably disposed between the parallel linkage arms 19 and 20. The slide 44 can be moved forward or rearward by using a wrench to engage a 1-⅛ inch head on the end of a threaded rod 46 which cooperates with the slide and this adjustment allows control over the amount of weight transferred from the tool bar 12 to the cultivator frame 14.

Vertically and adjustably supported between the right and left mast plates 34 and 36 is a gauge wheel support arm 50 on which is journaled at the lower end thereof a pair of gauge wheels 52 and 54. As shown in FIG. 4, the gauge wheel support arm 50 includes a spacer bushing 56 between each of the gauge wheels 52 and 54 and the arm 50 such that a predetermined gap exists between the two gauge wheels. While not specifically illustrated in the drawings, means are provided for adjusting the vertical distance between the axle bolt 57 of the gauge wheels and the frame 14 by turning a threaded rod 59 using the same size wrench used to adjust the down-weight and from a location at the rear of the cultivator unit.

Again, with reference to FIG. 1, there can be seen projecting down from the bottom of the mast plates 34 and 36 a bifurcated coulter support having spaced apart legs 58 and 60 between which a stabilizing coulter blade 62 is journaled. More particularly, and with reference to FIG. 3, passing through the legs 58 and 60 at the lower end thereof is a bolt 64 which also passes through a hub and bearing assembly (not shown) centrally disposed on the far side of the coulter 62 when it is viewed as in FIG. 3. The upper portion of the coulter support is adapted to fit between a pair of channel guides bolted between the mast plates 34 and 36. A threaded rod 65 having a 1-⅛ inch hex head cooperates with the guides and the coulter support to permit the raising and lowering of the coulter blade relative to the frame using the same wrench as used for the other adjustable implements on the cultivator.

An important feature of the present invention resides in the fact that the leading edge portion of the coulter blade 62 is centered in the gap between the trailing edges of the gauge wheels 52 and 54. That is to say, the bushings 56 associated with the gauge wheels 52 and 54 provide a sufficient spacing therebetween to allow the leading edge portion of the coulter blade 62 to fit into that gap. As will be described in greater detail hereinbelow, this particular feature vastly improves the ability of the coulter blade 62 to cut through crop residues, weeds and other debris or trash normally encountered in minimum tillage agricultural practices.

Another cultivating implement which may optionally be carried by the frame 14 is an assembly comprising two concave shaped cut-away disks 66 and 68 which are, respectively, journaled for rotation on the lower ends of arms 70 and 72. The arms, in turn, are fastened to the ends of a pivot axle 74 by a bolt 76 which is made to pass into a selected one of a plurality of indentations 78 formed into the side surface of the arm 70. A friction clamp 80 surrounds the axle 74 and, when the bolt 82 is loose, the arm 70 can be rotated to lift the cut-away disk 66 to a position where it will no longer engage the soil such as is shown in FIG. 3. Of course, the other cut-away disk 68 will also be raised and lowered simultaneously.

As shown in FIG. 3, and as will be later described, it has also been found that the use of rotary hoe wheels, which are planar disks having radially extending spikes, may effectively be substituted for the inclined concave cut-away disks. Such a substitution has been found to alleviate the plugging problem in that they do not tend to concentrate the residue in the path of the cultivator unit's shank, but instead cooperatively encourage the straight through material flow.

With reference again to FIG. 1, it can be seen that the rear edges of the frame mast members 34 and 36 are turned inward to form flanges 34a and 36a. In the lower portion of each of these flanges is cut a vertical slot as at 84 through which are fitted the bifurcated arms 86 and 88 of a middleworker holder 90. Fastened to and projecting vertically down from the holder 90 is the shank 92 of the middleworker assembly and it comprises a generally flat plate approximately 0.5 inches in thickness and it is of a sufficient width to provide the necessary structural rigidity, given its intended purpose. As can best be seen in the side elevation of FIG. 3, the shank 92 projects vertically downwardly for a predetermined distance and then slopes downwardly and forwardly terminating in a nose portion 94 to which is fastened a subsoil point member 96 by means of a bolt 98. The subsoil point member 96 is preferably formed from a heat-treated material and is of a width greater than the thickness dimension of the shank 92 and, thus, provides an increased surface in contact with the ground. As will become more apparent hereinbelow, this feature is used to create an increased downward force on the entire frame assembly 14, much like the flukes on an anchor, as the tractor vehicle pulls it across the field being cultivated.

Welded to each side surface of the lower edge portion of the shank 92 is a frog having rearwardly and outwardly sweeping wings 100. Attached to each of these wings is a replaceable lay share 102 and 103 which are held onto the wings by means of bolts 104. The lay shares 102 and 103 are designed to be at an angle of 31°±1° with respect to the horizontal which is considerably more steep than prior art cultivator sweeps. The angle in question is identified as angle "a" in FIG. 1.

Also secured to the shank is a ridger assembly indicated generally by numeral 106, the assembly comprising a support plate 108 which may be bolted to the shank 92 by means of bolts 110 and 112. Fastened to the support plate 108 by means of an adjustable spacer device 114 are ridger wings 116 and 118. By appropriately adjusting the spacer 114, the angular disposition between the ridger wings can be set. Moreover, by removing the lowermost bolt 112 from the aligned holes formed through the support plate 108 and the shank 92, the entire ridger assembly 106 may be swung upward, as illustrated in FIG. 3, so that it no longer will engage the soil as it is worked by the shares 102.

A pair of compression springs 120 and 122 are operatively disposed between the frame 14 and the middleworker holder 90 which permits the middleworker assembly to deflect a predetermined distance should the subsoil point 96 encounter an obstruction such as a large rock. This deflection allows the point and lay shares of the middleworker assembly to ride over the obstruction. The compression springs 120 and 122 are captured by a U-bolt 124 coupled to the frame in that the legs of the bolt 124 pass through the centers of the springs 120 and 122, the bottoms of which engage a cross-member (not shown) affixed to the bifurcated arms 86 and 88 of the shank support 90. A spring cover 126 rests on top of the other end of the springs 120 and 122, while 1-⅛ inch adjustment nuts 128 allow control over the force exerted by the coil springs when adjusted with a wrench.

With continued reference to FIG. 3, the details of the rotary hoe wheels and their attachment to the frame assembly will now be described. As is illustrated, the rotary hoe wheel assembly comprises a pair of hoe wheels 130 which are held in parallel, spaced apart relationship by tubular spacers disposed upon an axle bolt 132 passing through the hub 134 of the hoe wheels. The tubular spacer (not shown) is such so as to maintain the hoe wheels approximately five to seven inches apart and these wheels are journaled for rotation at the lower end of a two-piece extendable arm member 136. More particularly, the arm member 136 includes an outer channel member 138 and a inner channel member 140 which is sized so as to be telescopingly received within the upper channel member 138. A series of aligned holes regularly spaced along the lengths of the upper and lower channels 138 and 140 permit the overall length of the arm 136 to be adjustably set by inserting a bolt 142 through a selected pair of aligned holes in the two members.

The upper channel 138 is pivotally secured to the frame member 16 as at 144. Secured to the frame member 16 is a bracket 146 to Which a rod 148 is linked. The other end of the rod 148 passes through a hole in a triangular bracket 150 which is welded or otherwise attached to the outer channel member 138. Surrounding the rod 148 is a compression spring 152 whose lower end rests against the base of the bracket 150. A set collar 154 and washer 156 is placed onto the rod 148 and may be used to adjust the force with which the compression spring 152 exerts on the rotary hoe wheel support arm assembly 136. The pressure is typically set to a value which will insure that the curved radial spikes on the hoe wheels 130 will penetrate the earth, but with the spring providing sufficient resiliency to allow the hoe wheel assembly to ride over large rocks or other similar pipe obstacles which might be present in the field being worked.

OPERATION

In operation, the tool bar 12 is coupled to a tractor vehicle by means of a conventional three-point hitch or other appropriate device. Such a hitch typically has hydraulic actuators associated with it to permit the tool bar and the attached ganged cultivator units to be lifted completely free of the ground as when traveling to or from the field to be worked or when completing a pass through the field and turning to initiate another. The cultivator units will be spaced along the tool bar 12 by a distance corresponding to the center-to-center position of the row crops in the field. The two gauge wheels 52 and 54 control the operating depths of the cut-away disks 66 and 68 and of the lay shares 102 and 103. As mentioned above, the height setting of the gauge wheels 52 and 54 can be adjusted by turning a threaded rod (not shown) disposed between the frame and the gauge wheel support arm 50.

The coulter 62 effectively performs three separate functions. First, it serves to stabilize side-to-side movement of the cultivator assembly which may occur, for example, when tilling on a hillside. Furthermore, because the cut-away disks 66 and 68, when used, are disposed at a predetermined angle or pitch relative to the direction of travel of the cultivator, they can exert a substantial side-to-side pulling effect which is thereby compensated by the coulter cutting blade 62. The coulter blade's second function is to cut and divide the residue directly ahead of the middleworker's shank 92 and thus help to prevent plugging and bunching of debris in heavy residue, e.g., as corn stalks. Typically, the lower edge of the cutting coulter 62 will be set ±1 inch relative to the tip of the subsoiler point 96. If, in use, residue is found to build up on the sweep shank, it is known that the coulter is either not set sufficiently deep or that the entire gang of cultivator units is running too shallow. Correction is afforded in accordance with the present invention by either adding more gang weight or by adjusting the depth of the cutting coulter 62 by turning a threaded rod operatively disposed between the bifurcated coulter support arms 58 and 60 and the frame 14. The third function performed by the coulter blade is to offer "gauge wheel" protection to the shank and middleworker.

In much the same way as the foot on a sewing machine holds the cloth as it is pierced by the needle, as the cultivator units traverse the field between rows in which crops are planted, the gauge wheels 52 and 54 tend to compress and hold residue against the ground. This effect is especially beneficial in a ridged field application where the total field residue may be concentrated two to three times normal depth in the inter-row area. Because the overlapping relationship between the coulter blade 62 and the gauge wheels 52 and 54, the coulter cutter is able to slice through the residue as it is held by the gauge wheels. Thus, the residue is not merely forced downward into the ground without being cut. Because the residue tends to be compressed by the gauge wheels, it does not tend to catch on the fork assembly journaling the stabilizing coulter, and further reducing any tendency toward plugging.

Following directly behind the stabilizing coulter and penetrating into the soil is the subsoil point 96 fastened to the forward nose 94 of the middleworker shank 92. As already mentioned, the point 96 has a greater width dimension than the thickness of the shank 92 and the forward motion of the oultivator relative to the ground causes the subsoil point 96 to dig itself deeper into the soil, adding to the effective downward force of the cultivator and resisting any counter forces tending to cause the lay shares 102 and 103 to ride upward out of the soil.

The action of the flared-out lay shares 102 and 103 is to turn and churn the soil and residue. By disposing the shares 102 and 103 at an angle in the range of from 30° to 32° relative to the horizontal, it is found that fairly aggressive mixing and "boiling" of soil is achieved in addition to the aforementioned reduction in soil slabbing.

The optional cut-away disks 66 and 68 are designed to cut soil away from the crop row and till the area which is not reached by the sweep shares 102 and 103. By loosening the clamping nut 82 and sliding the support rod 74 inwardly or outwardly relative to the mast plates 34 and 36, the disks may be set as close to the row as the operator chooses. It is found that a spacing of about 6 to 8 inches between the disks 66 and 68 or from 3 to 4 inches from the plants themselves is typical. Vertical adjustment of the cut-away disks 66 and 68 is achieved by loosening the bolt 76 from the end of the rod 74 and sliding the arm 70 through the bracket until a desired one of the height determining detent holes 78 is aligned with the bolt.

By proper adjustment of the depth and spacing of the cut-away disks, it is possible to work the soil close to the plant row without significantly pruning the plant roots growing on the ridges. This is because the disk cuts very shallow at the point in which it enters the soil close to the plant while soil penetration increases farther away from the plant towards the center of the cut-away disks. As is shown in FIG. 3, the cutaway disks can be rotated to a non-working disposition.

In that concave cut-away disks contribute to plugging problems in residue cultivators, especially when operating at medium to higher speeds and through heavy residues, the basic design intent of the present invention is to create a cultivator which will remove weeds from row middles and up to and adjacent to the row crop without necessarily utilizing such cut-away disks. This goal has been realized by the increased working width and aggressive attack angle of the middleworker lay shares 102 and 103 as compared to those of conventional cultivator sweeps, the effect being further enhanced by the high-speed operation of the cultivator unit. When it is considered that a typical, prior art residue cultivator configured for row crops space 30 inches apart would typically utilize a 14 inch to 16 inch sweep and two cut-away disks, each effectively working about a two inch strip, such an arrangement would weed 18 inches to 20 inches at best, assuming no overlap. Even without cut-away disks, the prior art shares would typically till a 21 inch wide area.

Where weeds are present very close to the crop row and/or the scattering residue and soil resulting from high-speed operation may cover or damage small growing crops, the rotary hoe wheels illustrated in FIG. 3 is a recommended option. As was mentioned earlier, and can be seen in FIG. 5, the two rotary hoe wheels 130 may typically be 21 inches in diameter and are adjustably spaced from five to seven inches apart and are journaled for rotation at the end of an adjustable length arm 140 which is urged downward by a compression spring 152. Such hoe wheels assembly operates parallel to the direction of travel while removing weeds close to the crop row. The wheels tend to shield and protect the growing crop while their revolving action enhances the residue flow through the machine. In that one rotary hoe wheel on a given cultivator stage is spaced from its adjacent neighbor by a distance slightly greater than the width of the lay shares 102 and 103, the movement of the spikes or tines through the ground creates a fault line to the share tips so that the entire row middle is worked by the middleworker assembly. The five inch to seven inch area, where the row crop plants are growing spanned by the spaced rotary hoe wheels on the same cultivator stage, remains relatively undisturbed.

In the embodiment of the present invention, the shank 92 may typically be only one-half inch in width as compared to a conventional row cultivator such as that described and depicted in U.S. Pat. No. 4,461,355, where the width is two inches or more. When soil and residue travels over the sweep and around the shank on the prior art row cultivator, the increased width of the shank tends to further spread and direct slabs or ribbons of soil formed by the sweep into the row where they can cause damage to such row crops as corn and soybeans. With the narrower shank of the present invention, however, slab deflection is effectively eliminated without having to reduce the tractor speed.

Another advantage inherent in the design of the present invention resides in the compactness of the cultivator unit measured from front to rear. In that the cutting coulter 62 fits between the gauge wheels 52 and 54 and because the shank and sweep is designed to closely follow behind the cutting coulter, the center of mass of the cultivator unit 10 is positioned closer to the tool bar 12 than in prior art designs. This requires less torque force to raise the tool bar 12 than with the prior art design. Furthermore, by adjusting the threaded bolt 46 located at the rear of the top parallel linkages 19 and 20, additional weight can be selectively transferred to one or more of the ganged cultivator units to increase the down pressure so that the cut-away disks 66 and 68 (if used) and the middleworker including the lay shares 102 and 103 will achieve a desired degree of penetration. For example, the gangs trailing immediately behind the tractor wheels typically require more down force than those that are disposed outward from the tractor wheels in that the following gangs encounter soil compacted by the tractor wheels. This can be compensated for by proper setting of the 1-⅛ inch threaded bolt.

The shank 92 and its attached lay shares and ridger blades may be disconnected from the support arm 90 by removing the bolts securing the two together and replacing with a fertilizer knife for use in a "pre-plant fertilization" operation. Being disposed immediately behind the coulter, a path for it is cut by the coulter. Alternatively, the fertilizer knife may be attached by a suitable bracket so as to travel immediately behind the middleworker in the fashion described in the afore referenced Peterson, et al U.S. Pat. No. 4,560,011.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A row crop cultivator mounted on an agricultural tool bar to be pulled by a tractor vehicle for working the soil between adjacent crop rows with a plurality of implements and forming the thus worked soil into ridges along said crop rows, said cultivator comprising:
    (a) a frame suspended from said tool bar;
    (b) a pair of gauge wheels mounted in slightly spaced-apart relation on a common rotational axis, said pair of gauge wheels supporting said frame;
    (c) a disk-shaped coulter blade rotatably suspended from said frame and with the leading edge surface of said diskshaped coulter blade positioned between and forward of the trailing edges of said pair of gauge wheels; and
    (d) a middleworker assembly suspended from said frame by a shank, said shank having flared wing members on each side of the lower end thereof, said middleworker assembly including a point member attached to the lower leading edge of said shank forward of said flared wing members, said point member being generally aligned with and aft of said disk-shaped coulter blade, and a pair of replaceable lay share members detachably secured to said flared wing members on said shank rearward of said point member, said point member providing a downward force on said sweep when being pulled through the soil as said lay share members break up said soil and residue and said middleworker traverses the ground.

2. The cultivator as in claim 1 wherein said disk-shaped coulter blade is positioned to cut through crop and weed residue on and in the soil as said residue is being engaged by said pair of gauge wheels.

3. The row crop cultivator as in claim 1 and further including first and second cut-away disks rotatably suspended from said frame and positioned on opposed sides and aft of said pair of gauge wheels, each of said blades having a concave work surface for clearing a strip of top soil and residue, mixing same and displacing the mixture laterally between said disk blades.

4. The row crop cultivator as in claim 1 and further including first and second ridger blades joined to said shank and selectively positionable between an elevated position out of contact with the soil and a lowered position which is above and generally vertically aligned with said sweep share members, said first and second ridger blades when in said lowered position forming said soil and residue into a pair of parallel ridges on opposite sides of said shank along adjacent crop rows.

5. The cultivator as in claim 1 wherein the width dimension of said shank is insufficient to cause displacement of soil and residue slabs onto said crop rows as said cultivator is pulled through a field of said crop rows.

6. The row crop cultivator as in claim 1 and further including:
   (a) a pair of spaced apart rotary hoe wheels suspended from said frame and journaled for rotation at one end of a support arm, said support arm being pivotally joined to said frame and laterally offset to one side of said middleworker assembly, the spacing between said rotary hoe wheels being a predetermined distance greater than the width of row in which the crop grows so that the hoe wheels on said one end of said support arm straddle said row.

7. The row crop cultivator as in claim 6 wherein said hoe wheels each comprise a central hub and a plurality of radially spaced, arcuate spikes radicating from said hub.

8. The row crop cultivator as in claim 7 and further including means for resiliently biasing said support arm to urge said hoe wheels into the ground.

9. A row crop cultivator stage mounted on an agricultural tool bar with other like stages to be pulled by a tractor vehicle for working the soil between adjacent crop rows, each stage comprising:
   (a) a frame suspended from said tool bar and spring biased downwardly;
   (b) a pair of gauge wheels mounted in parallel, slightly sapced-apart relation on a common, horizontally oriented rotational axis, said pair of gauge wheels supporting said frame at a selectable elevation relative to the ground, said elevation being adjusted at a single location;
   (c) a disk-shaped coulter blade adjustably suspended from said frame with the leading edge suface of said disk-shaped coulter blade positioned in the space between and a predetermined distance forward of the trailing edges of said pair of gauge wheels such that crop and weed residue is captured by said gauge wheels and pressed against the ground while being served by said coulter blade; and
   (d) a soil treating implement suspended from said frame by a shank, said implement being aligned with and aft of said disk-shaped coulter blade.

10. The cultivator as in claim 9 wherein said soil treating implement is a middleworker.

11. The cultivator as in claim 9 wherein said soil treating implement is a fertilizer knife.

12. The cultivator as in claim 10 wherein said middleworker includes a point member of a width dimension greater than the width of said shank attached to the forward edge of said shank at the lowermost end thereof and first and second lay shares attached to said shank aft of said point member, said lay shares flaring outwardly and rearwardly from opposed side surfaces of said shank.

13. The row crop cultivator as in claim 12 and further including:
   (a) an arm member pivotally attached at one end to said frame proximate the point of attachment of said frame and said tool bar;
   (b) a pair of spaced apart hoe wheels journaled for rotation at the other end of said arm member, the spacing between said hoe wheels sufficient to straddle a row of growing crops and the spacing between hoe wheels attached to adjacent stages being slightly greater than the lateral dimension spanned by said lay shares of said middleworker; and
   (c) means for resiliently forcing said rotary hoe wheels toward and into the ground at a location alongside the outer end of said lay shares.

* * * * *

UNITED STATES PATENT AND TRADEMARK OFFICE
CERTIFICATE OF CORRECTION

PATENT NO. : 4,834,189
DATED : May 30, 1989
INVENTOR(S) : Richard L. Peterson, et al.

It is certified that error appears in the above-identified patent and that said Letters Patent is hereby corrected as shown below:

```
Column 10, line 52, delete "slightly".
Column 12, line 6, change "sapced-apart" to -- spaced-
    apart --
Column 12, line 18, change "served" to -- severed --.
```

Signed and Sealed this

Eighth Day of May, 1990

Attest:

HARRY F. MANBECK, JR.

*Attesting Officer*  *Commissioner of Patents and Trademarks*

US004834189B1

REEXAMINATION CERTIFICATE (4140th)

United States Patent [19]
Peterson et al.

[11] B1 4,834,189
[45] Certificate Issued Aug. 29, 2000

[54] ROW CROP CULTIVATOR

[75] Inventors: Richard L. Peterson, LeSueur; James A. Johnson, Cologne; Vincent J. Tomlonovic, North Mankato, all of Minn.

[73] Assignee: Hiniker Company, Mankato, Minn.

Reexamination Request:
No. 90/003,881, Jun. 29, 1995

Reexamination Certificate for:
Patent No.: 4,834,189
Issued: May 30, 1989
Appl. No.: 07/137,927
Filed: Dec. 28, 1987

Certificate of Correction issued May 8, 1990.

[51] Int. Cl.⁷ .............................. A01B 39/08; A01B 39/14
[52] U.S. Cl. .......................... 172/166; 172/722; 172/158; 172/310; 172/624.5; 172/510; 172/193; 111/126
[58] Field of Search ...................................... 172/145, 149, 172/151, 158, 166, 175, 184, 196, 155, 520, 538, 539, 699, 700, 721–726, 730, 193, 194, 180; 111/139, 140, 143, 157, 167, 163–165

[56] References Cited

U.S. PATENT DOCUMENTS

| | | | |
|---|---|---|---|
| 877,899 | 2/1908 | Bowen | 172/193 |
| 1,483,776 | 2/1924 | Cadenhead | 172/722 |
| 1,528,443 | 3/1925 | McGee | 172/193 |
| 1,698,019 | 1/1929 | Howell et al. | 172/151 |
| 1,872,623 | 8/1932 | East et al. | 172/193 |
| 2,337,777 | 12/1943 | Seaholm | 172/722 |
| 2,420,551 | 5/1947 | Morkoski | 111/87 |
| 2,440,174 | 4/1948 | Howard | 172/166 |
| 3,171,500 | 3/1965 | Dils, Jr. | 172/700 |
| 3,621,922 | 11/1971 | Hinken | 172/555 |
| 3,870,108 | 3/1975 | Orthman | 172/722 |
| 3,880,242 | 4/1975 | Rogers | 172/740 |
| 3,923,103 | 12/1975 | Davis et al. | 172/201 |
| 4,054,007 | 10/1977 | Moore | 111/6 |
| 4,457,381 | 7/1984 | Wetmore | 172/722 |
| 4,461,355 | 7/1984 | Peterson et al. | 172/156 |
| 4,585,074 | 4/1986 | Fleischer et al. | 172/194 |
| 4,601,248 | 7/1986 | Beasley | 172/151 |
| 4,645,013 | 2/1987 | Edmisson | 172/730 |
| 4,819,737 | 4/1989 | Frase | 172/193 |
| 5,027,724 | 7/1991 | Ptacek et al. | 172/737 |

Primary Examiner—Christopher J. Novosad

[57] ABSTRACT

An improved row crop cultivator for use in minimum tillage applications is described. A plurality of ganged cultivating units are mounted on a tool bar adapted to be towed behind a tractor vehicle. Each cultivating unit comprises a frame which is supported on a pair of spaced-apart gauge wheels. Also mounted on the frame for rotation within the gap between the gauge wheels is a disk-shaped coulter blade which is configured to cut through crop residue and weed debris as the material being cut is held against the ground surface by the gauge wheels. This arrangement tends to prevent improper cutting known as "hair-pinning". Trailing directly behind the coulter blade is a middleworker comprising a narrow width shank depending from the frame and having a weld point on its lower leading edge and wing-like share blades flaring rearwardly and outwardly at a predetermined angle from the lower end of the shank. The middleworker design reduces the tendency for slabs of earth to be thrown onto the thereby damaging growing row crops.

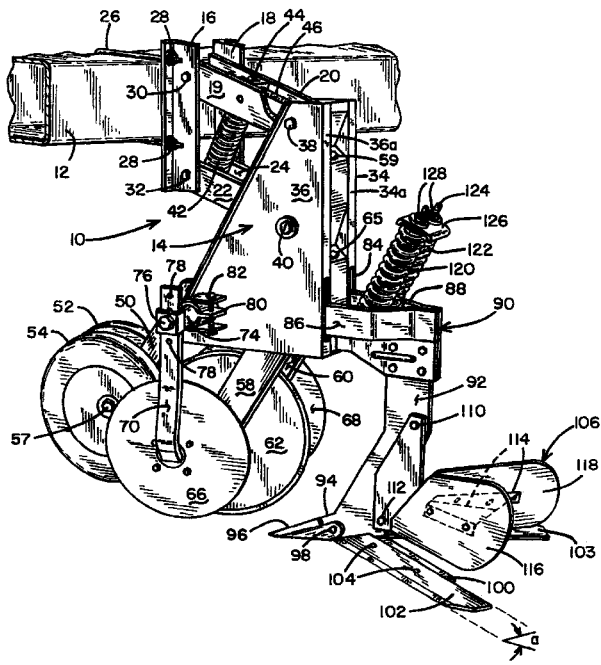

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–13 are cancelled.

* * * * *